Oct. 19, 1954    E. C. McRAE    2,691,903
TRANSMISSION

Filed Aug. 12, 1950    3 Sheets-Sheet 1

E. C. McRAE
INVENTOR.

BY J. L. Faulkner
G. H. Oster

ATTORNEYS

Oct. 19, 1954

E. C. McRAE 2,691,903

TRANSMISSION

Filed Aug. 12, 1950

E. C. McRAE
INVENTOR.

BY J. R. Faulkner
J. H. Oster

ATTORNEYS

Oct. 19, 1954     E. C. McRAE     2,691,903
TRANSMISSION

Filed Aug. 12, 1950     3 Sheets-Sheet 3

E.C. McRAE.
INVENTOR.

BY J. R. Faulkner
T. H. Oster

Patented Oct. 19, 1954

2,691,903

UNITED STATES PATENT OFFICE 2,691,903

TRANSMISSION

Edwin C. McRae, Dearborn, Mich., assignor to Ford Motor Company, Dearborn, Mich., a corporation of Delaware Application August 12, 1950, Serial No. 179,018

2 Claims. (Cl. 74—761)

1

This invention relates generally to a transmission and more particularly to the fluid pressure control system for a transmission.

Conventional automatic or semi-automatic transmissions for motor vehicles generally utilize a hydraulic system to control the operation of the transmission. Fluid under pressure is usually supplied to various hydraulically actuated control devices by a pair of fluid pumps of any suitable type, the rear pump being driven by the final drive shaft of the transmission while the front pump is driven by the vehicle engine. The rear pump is necessary to enable fluid pressure to be supplied when the vehicle is coasting and with a stalled engine. It is also used for taxi starts where the engine must be started by pushing the vehicle. The front pump is needed to furnish the necessary fluid pressure to operate the hydraulic control system of the transmission before the car is moving. Thus, although one pump may have sufficient capacity for the system, two must be employed and both must normally be driven at the same time resulting in extra power loss and unwanted generation of heat.

It is therefore an object of the present invention to provide a control system for a transmission of this type which is effective to almost eliminate the power loss in the front pump under such conditions that operation of the rear pump alone is sufficient to control the transmission. This is accomplished in the present invention by interrupting the supply of fluid from the transmission sump to the front pump, the pump thereafter running without fluid and thus cavitating with a relatively low heat and power loss. The fluid supply may be interrupted by means of a control valve operated by pressure supplied from a number of various points in the hydraulic system, such as directly from the output of the rear pump or from the fluid supply line to one of the hydraulically actuated control devices for the transmission.

Many present day automatic transmissions utilize a higher pressure to apply the high torque low and reverse speed bands, such as 150 p. s. i., and reduce the pressure to a lower value, such as 100 p. s. i., for the application of the high speed or direct drive clutch. Complicated hydraulic control mechanism is often required to obtain this variable fluid pressure control. In the present invention, however, this control may be effected automatically without additional expensive and troublesome controls. For example, the front pump may be arranged to deliver 150 p. s. i.

2 and the rear pump 100 p. s. i., and the control valve for the front pump may be connected to the fluid supply line for the direct drive clutch. Both pumps operate during low and reverse speeds and the higher pressure is available. During the high speed range, however, the fluid supply to the front pump is automatically interrupted by the actuated control valve, and the front pump becomes ineffective. The lower pressure of the rear pump then determines the pressure in the hydraulic system.

Alternatively, the control valve for the front pump may be connected to the outlet of the rear pump so as to render the front pump unproductive whenever the fluid pressure supplied by the rear pump reaches a predetermined value.

It is a further object of the present invention to provide a control system of the type discussed above which is extremely simple in construction and inexpensive to manufacture and which is consequently relatively trouble free and requires little maintenance.

Other objects and advantages of the present invention will be made more apparent as this description proceeds, particularly when considered in connection with the accompanying drawings, wherein.

Figure 3:
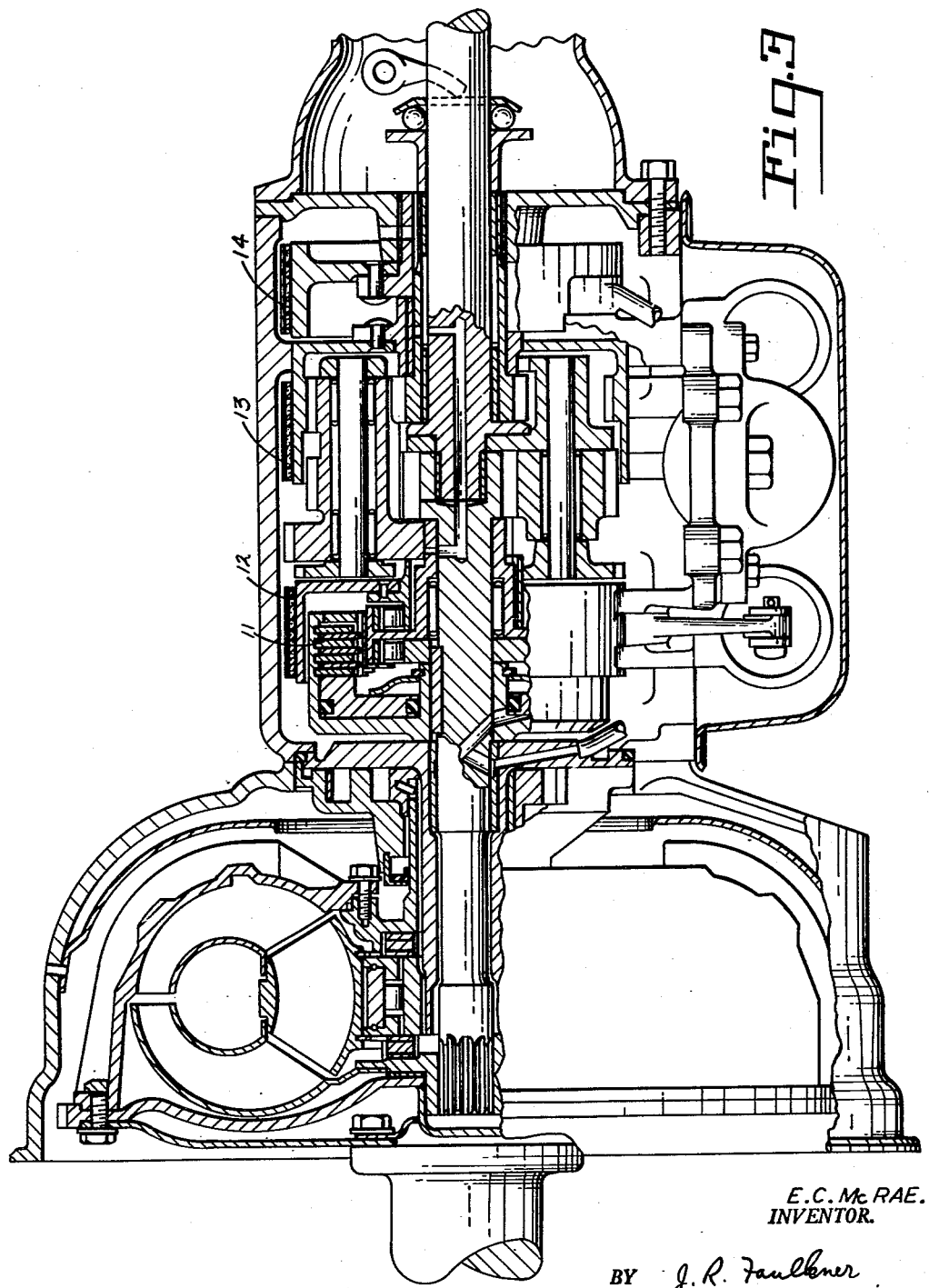
Figure 3 is a longitudinal cross sectional view through the gear unit.

For a more complete description of the gear unit shown in Figure 3, reference is made to Patent 2,628,510 issued in the name of E. C. McRae on February 17, 1953.

Figure 1:
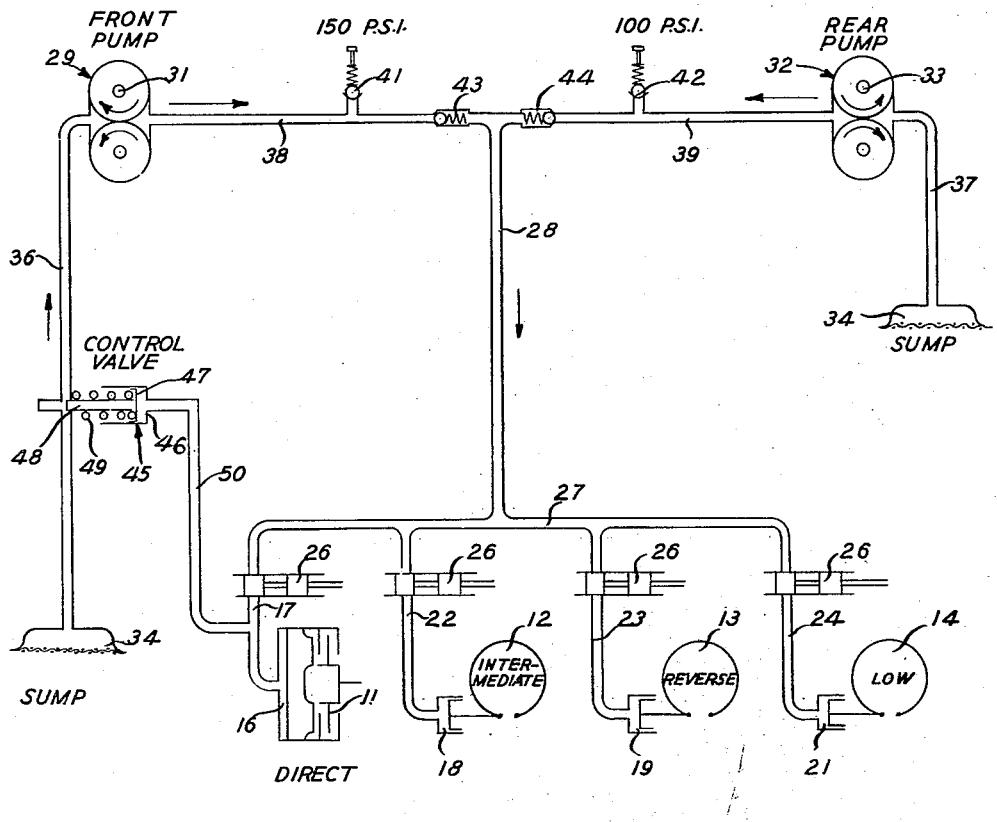
Figure 1 is a diagrammatic view of one embodiment of the present invention.

Referring now to Figures 1 and 3, the control system of the present invention is shown in the drawings as applied to a transmission having a direct drive clutch 11 and intermediate, reverse and low speed bands 12, 13 and 14 arranged to effect operation of the transmission in the respective speed ranges. It will be understood that the invention is applicable to other types of transmissions as well, such as two speed automatic transmissions, and others. The direct drive clutch 11 is applied by means of a hydraulic cylinder 16 supplied with fluid from a supply conduit 17. The intermediate, reverse and low speed bands are applied by cylinder and piston assemblies 18, 19 and 21 respectively which are supplied with fluid by supply conduits 22, 23, and 24 respectively. A suitably controlled valve 26 is interposed in each of the aforementioned supply lines to control the operation of the particular hydraulically actuated device, and the various supply lines are interconnected by header 27 to a main supply line 82.

Fluid under pressure is supplied to the main supply line 28 from a front pump 29, shown here as of the gear type, driven by an engine driven shaft 31, and also by a rear pump 32 driven by a shaft 33 operated by the driven shaft a transmission. The inlet of the front pump 29 is supplied with fluid from a sump 34 through a conduit 36 while the rear pump 32 is similarly supplied from the sump through a conduit 37.

The outlet conduits 38 and 39 of the front and rear pumps respectively are provided with conventional pressure relief valves 41 and 42 respectively and communicate with the common supply line 28 through check valves 43 and 44 respectively.

A control valve 45 comprising a cylinder 46, piston 47, piston rod 48 and return spring 49 is mounted adjacent the supply conduit 36 for the front pump. The piston rod 48 is arranged to block the flow of fluid through the conduit 36 from the sump 34 to the front pump when the valve 45 is supplied with fluid pressure. In the embodiment shown in Figure 1, a conduit 50 extends between the control valve 45 and the supply conduit 17 for the direct drive clutch. With this arrangement it will be apparent that when the valve 26 is operated to enable fluid pressure to be supplied to the actuating cylinder 16 for the direct drive clutch, the pressure will be transmitted to the control valve 45 through the conduit 50 to close the valve and interrupt the supply of fluid to the front pump 29. While the front pump still runs, it is without fluid and simply cavitates with a minimum of heat generation and power loss. Under these conditions check valve 43 is automatically closed and the rear pump 32 constitutes the sole source of fluid pressure for the control system.

The relief valve 41 for the front pump may be set at 150 p. s. i. while the relief valve 42 for the rear pump may be set at 100 p. s. i. Since both pumps will operate during reverse speed operation and also in the low and intermediate forward speed ranges, the 150 p. s. i. pressure supplied by the front pump will furnish the necessary high pressure for the proper operation of the respective brake bands. When the transmission is operating in direct drive, however, this high pressure is not needed, and is in fact undesirable since the direct drive clutch will operate smoother at a lower pressure and since the higher pressure would result in higher power loss and heat generation. The desired lower pressure for direct drive operation is automatically obtained since the relief valve 42 for the rear pump is set at 100 p. s. i. This automatic control of the fluid pressure is accomplished without additional troublesome controls usually employed for this purpose.

Figure 2:
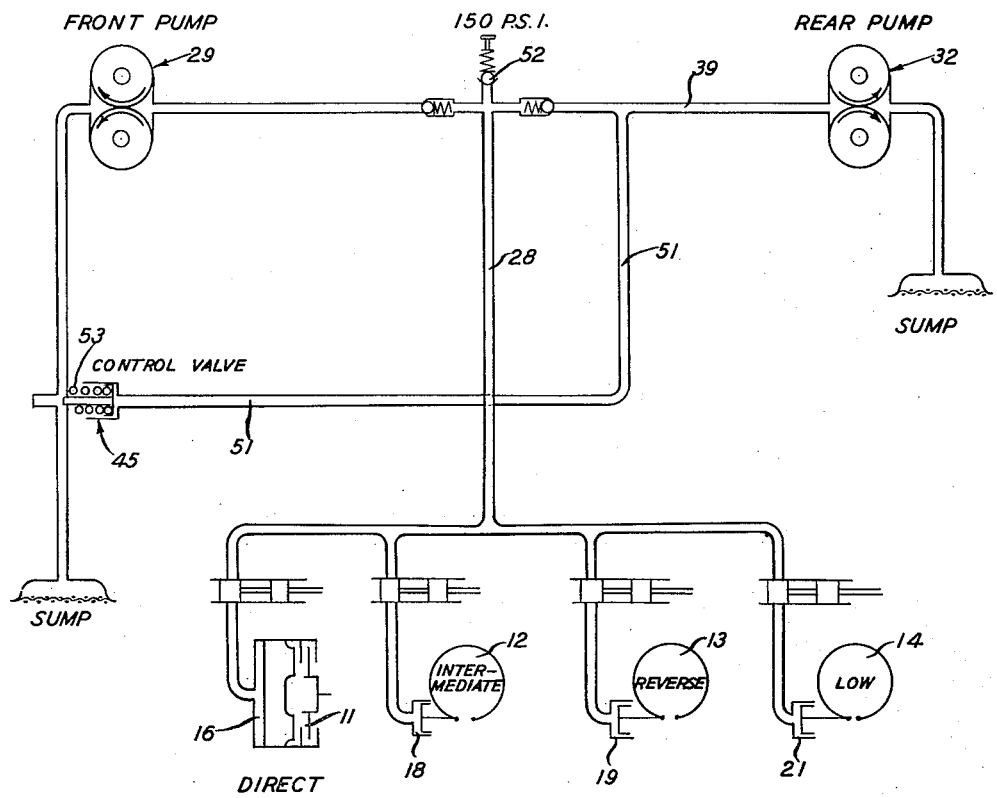
Figure 2 is a similar diagrammatic view but showing another embodiment.

In the modification shown in Figure 2, the control valve 45 is connected by means of a conduit 51 directly to the output conduit 39 of the rear pump 32 so as to be effective to cut out the front pump whenever the pressure in the rear pump is sufficiently high to operate the control valve against the action of its return spring 53. Only one relief valve 52 need be used with this arrangement.

Although a direct-acting plunger type valve is shown in the drawings, it will be understood that the valve controlling the supply conduit leading from the sump to the front pump may be of any suitable type. In addition, the pressure to operate the control valve may be obtained from other points in the hydraulic circuit.

It will be understood that the invention is not to be limited to the exact construction shown and described, but that various changes and modifications may be made without departing from the spirit and scope of the invention, as defined in the appended claims.

What is claimed is:

1. A hydraulic control system for a transmission having drive and driven shafts and hydraulically actuated devices for effecting a reverse speed ratio, a low forward speed ratio and a high forward speed ratio, comprising front and rear fluid pumps driven by said drive and driven shafts respectively, a common supply system from said pumps to said hydraulically actuated devices, a relief valve for controlling the pressure delivered from each of said pumps with the relief valve for said front pump being set for a higher pressure than the relief valve for said rear pump, a control valve on the inlet side of said front pump, and means operating said valve to interrupt the supply of fluid to said front pump when pressure is supplied to the hydraulically actuated device for said high speed ratio so that the rear pump only is operative when the transmission is in said high speed ratio and the pressure supplied is the lower value determined by the relief valve for said rear pump while the pressure supplied in said low and reverse speed ratios is the higher value determined by the relief valve for said front pump.

2. A hydraulic control system for a transmission having drive and driven shafts and hydraulically actuated devices for effecting a reverse speed ratio, a low forward speed ratio and a high forward speed ratio, comprising front and rear fluid pumps driven by said drive and driven shafts respectively, a relief valve for each of said pumps arranged so that said front pump delivers the higher pressure, a common supply system for said pumps including individually controlled supply lines to each of said hydraulically actuated devices, a hydraulically actuated shut off valve controlling the inlet of said front pump, means connecting said hydraulically actuated valve with the individual supply line for said high speed ratio device to interrupt the supply of fluid to said front pump whenever the transmission is operating in said high speed ratio, and a check valve between said front and rear pumps preventing flow of fluid from said rear pump to said front pump.

References Cited in the file of this patent

UNITED STATES PATENTS

| Number | Name | Date |
|---|---|---|
| 2,332,593 | Nutt et al. | Oct. 26, 1943 |
| 2,343,955 | Cotterman | Mar. 14, 1944 |
| 2,576,336 | Farkas | Nov. 27, 1951 |

FOREIGN PATENTS

| Number | Country | Date |
|---|---|---|
| 609,713 | Great Britain | Oct. 6, 1948 |

OTHER REFERENCES

Publication: Packard Serviceman's Training Book, May 16, 1949, Packard Motor Car Company, Detroit, Mich.